United States Patent [19]
Kriebel

[11] Patent Number: 5,427,393
[45] Date of Patent: Jun. 27, 1995

[54] CRATE MOVING DEVICE

[76] Inventor: Arlin L. Kriebel, R.D. #1 87 Hunsberger Rd., Telford, Pa. 18969

[21] Appl. No.: 67,948

[22] Filed: May 27, 1993

[51] Int. Cl.⁶ .............................................. B62B 1/00
[52] U.S. Cl. ............................. 280/47.28; 280/47.19; 280/47.131
[58] Field of Search ............... 280/47.28, 47.17, 47.19, 280/47.131, 47.26; 414/490

[56] References Cited

U.S. PATENT DOCUMENTS

| | | | |
|---|---|---|---|
| 1,257,787 | 2/1918 | Beum | 280/47.28 |
| 1,428,180 | 9/1922 | More | 280/47.28 |
| 2,487,441 | 11/1949 | Heilbronn | 280/47.19 |
| 2,590,154 | 3/1952 | Burns | 280/47.19 |
| 2,636,207 | 4/1953 | Reece | 280/47.19 |
| 5,256,025 | 10/1993 | Williamson | 280/47.28 X |

FOREIGN PATENT DOCUMENTS

| | | | |
|---|---|---|---|
| 1573125 | 7/1969 | France . | |
| 2405166 | 6/1979 | France | 280/47.28 |
| 1654091 | 6/1991 | U.S.S.R. | 280/47.19 |

*Primary Examiner*—Margaret A. Focarino
*Assistant Examiner*—Carla Mattix
*Attorney, Agent, or Firm*—Joseph W. Molasky & Associates

[57] ABSTRACT

A device for moving stackable crates which have hand grip orifices and bottom weight bearing flanges such as milk crates, egg crates, bread crates, etc. The device comprises a lever, a handle, a stop, a hook and a roller all attached to the lever. The lever is non-linearly shaped to facilitate use by a right handed or left-handed person and allows the device user to move stacked crates over rough floor surfaces.

7 Claims, 6 Drawing Sheets

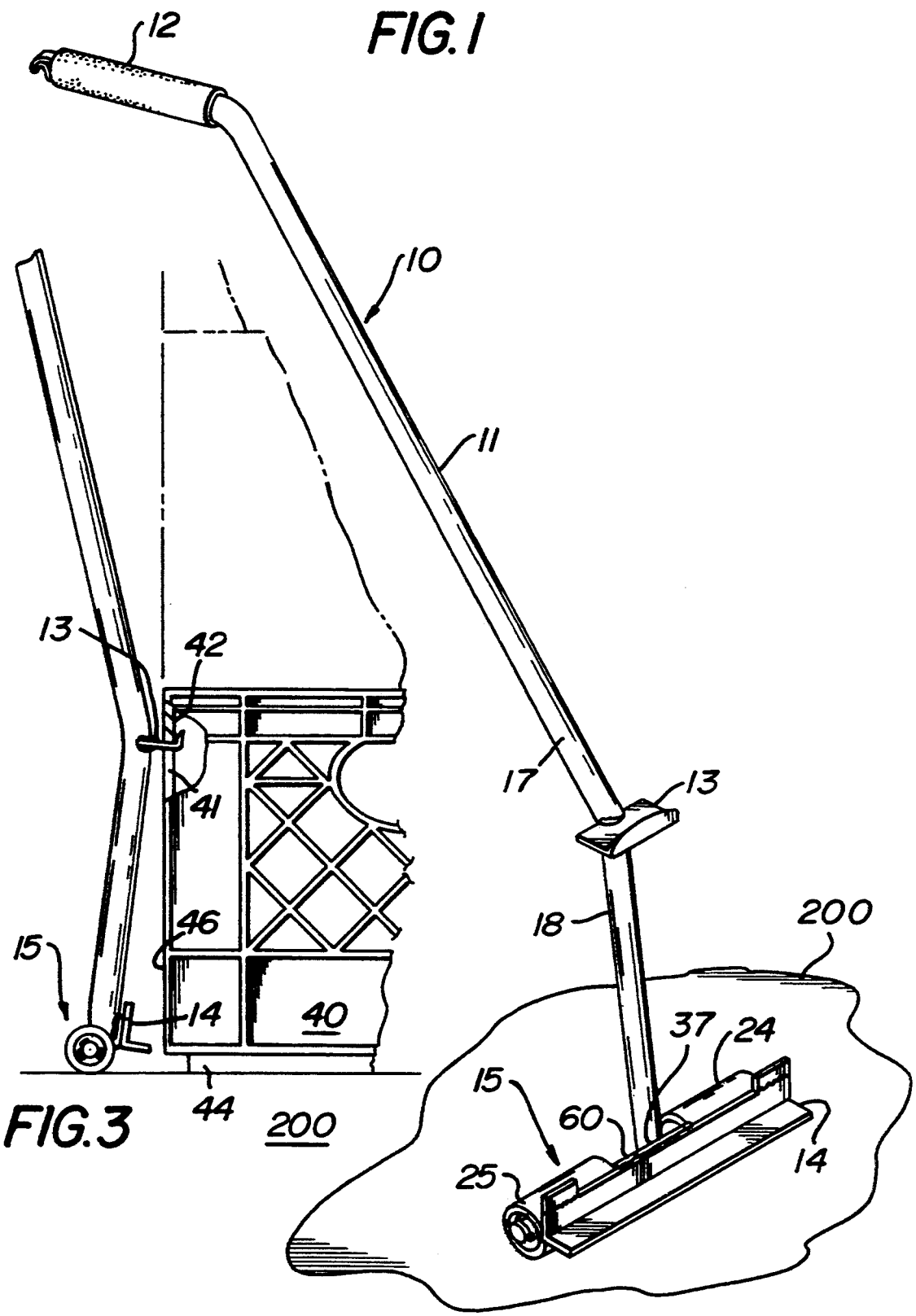

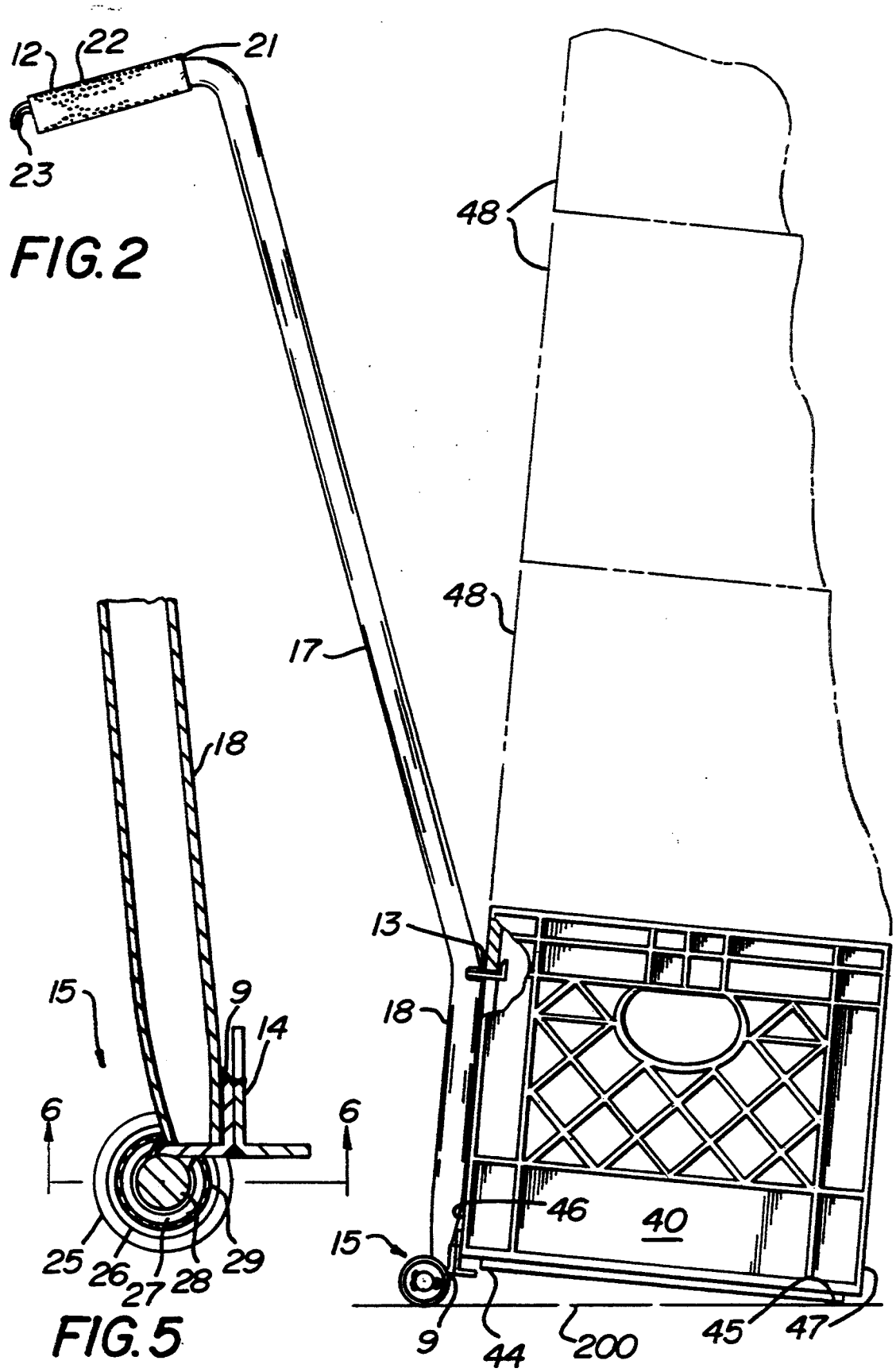

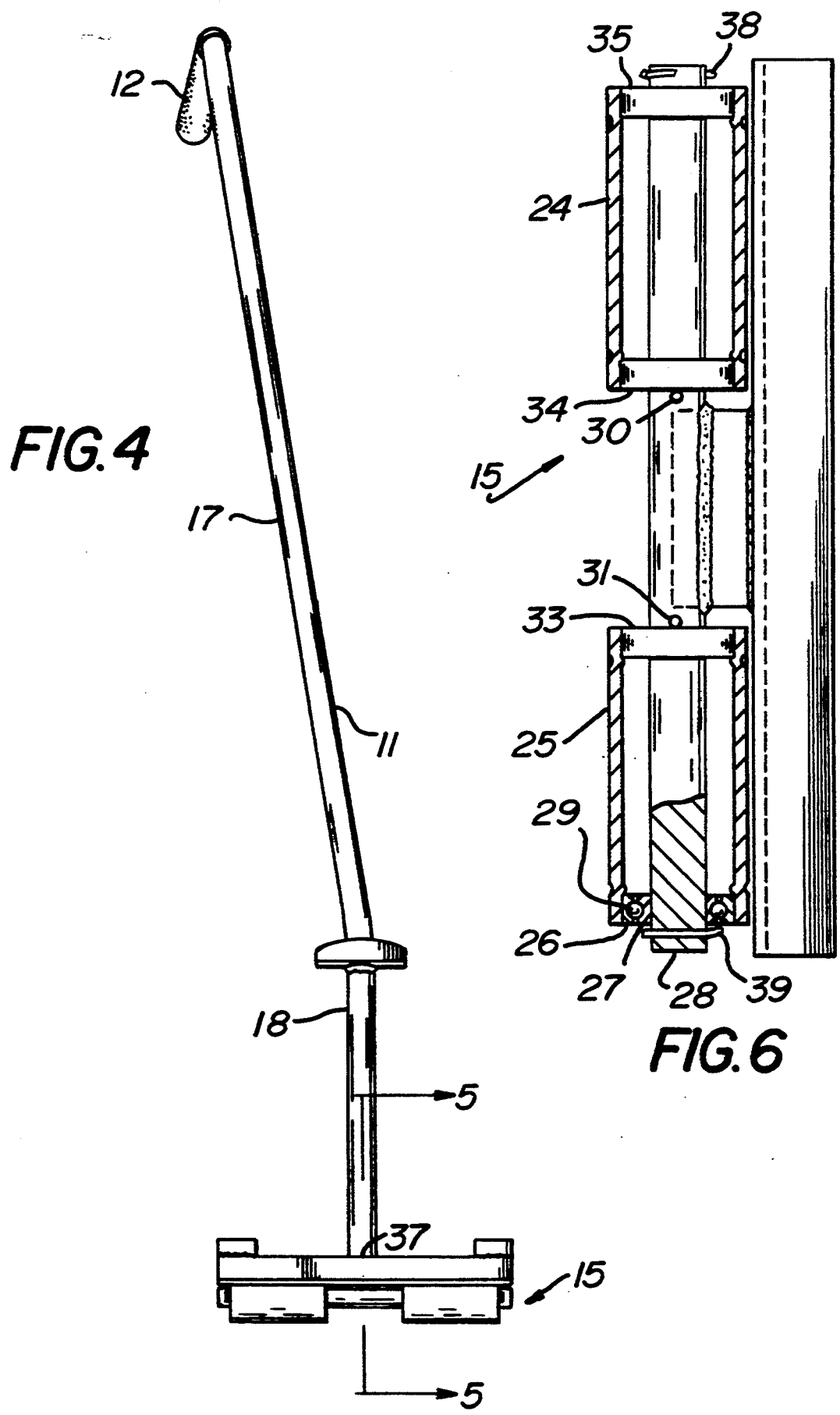

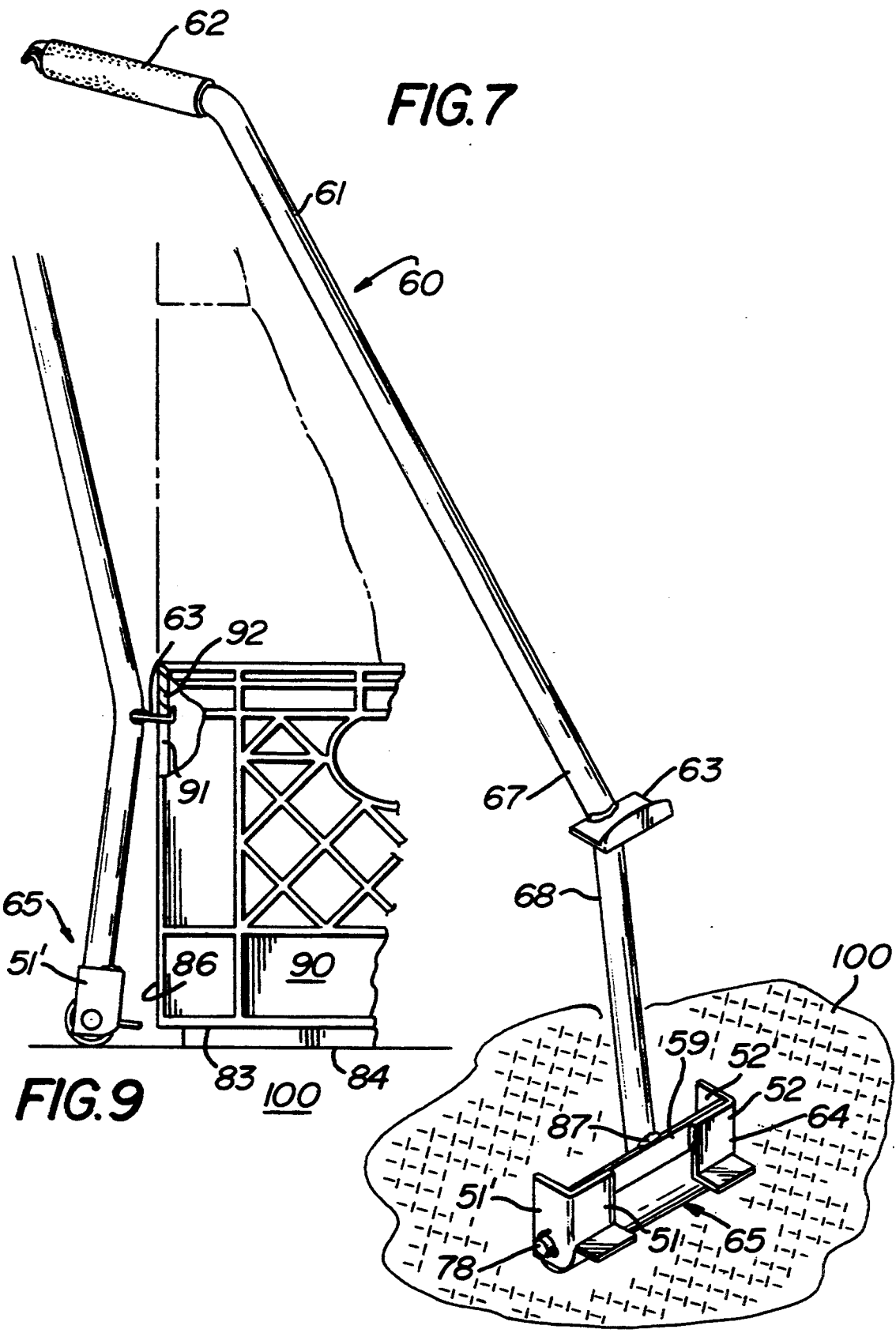

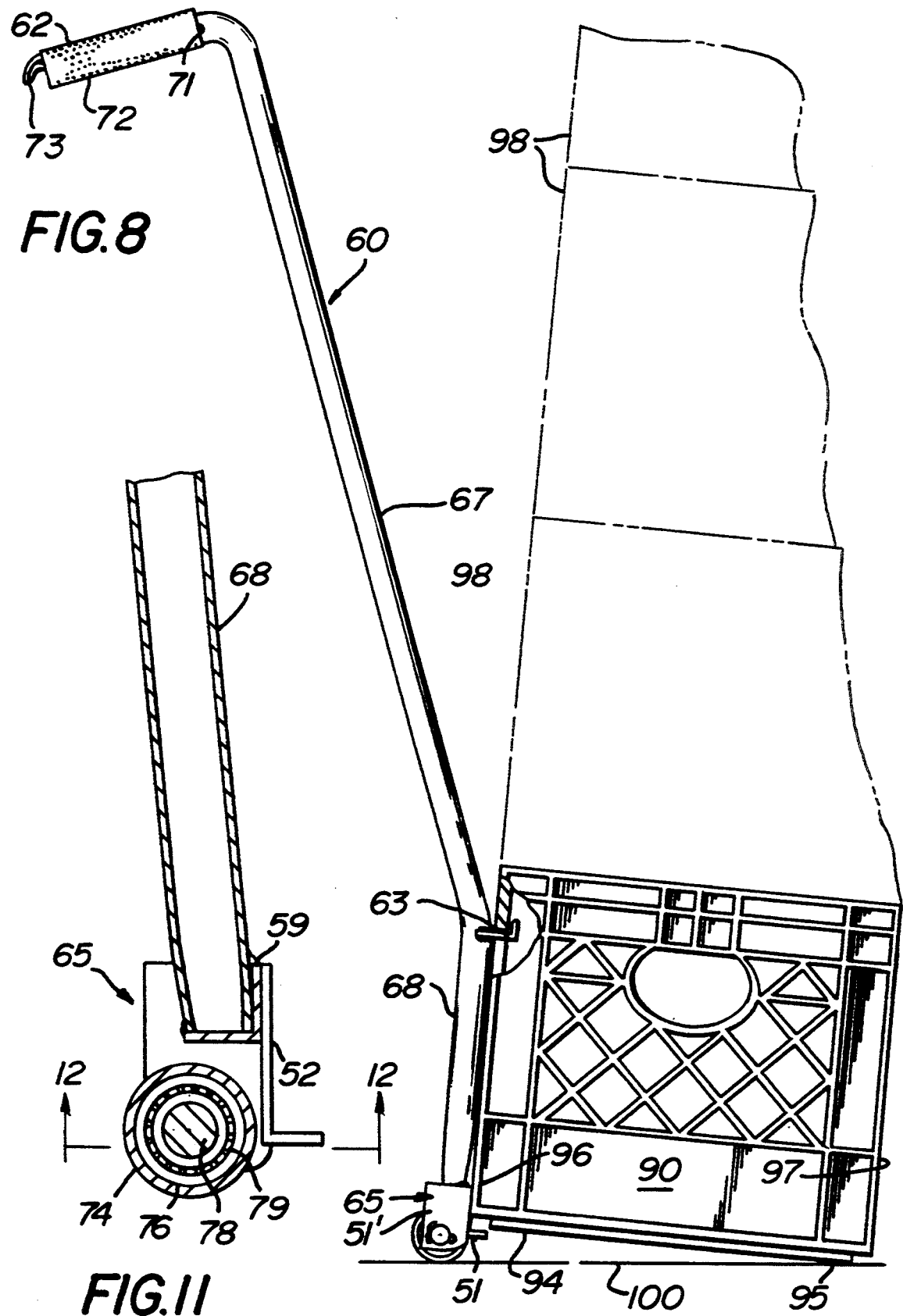

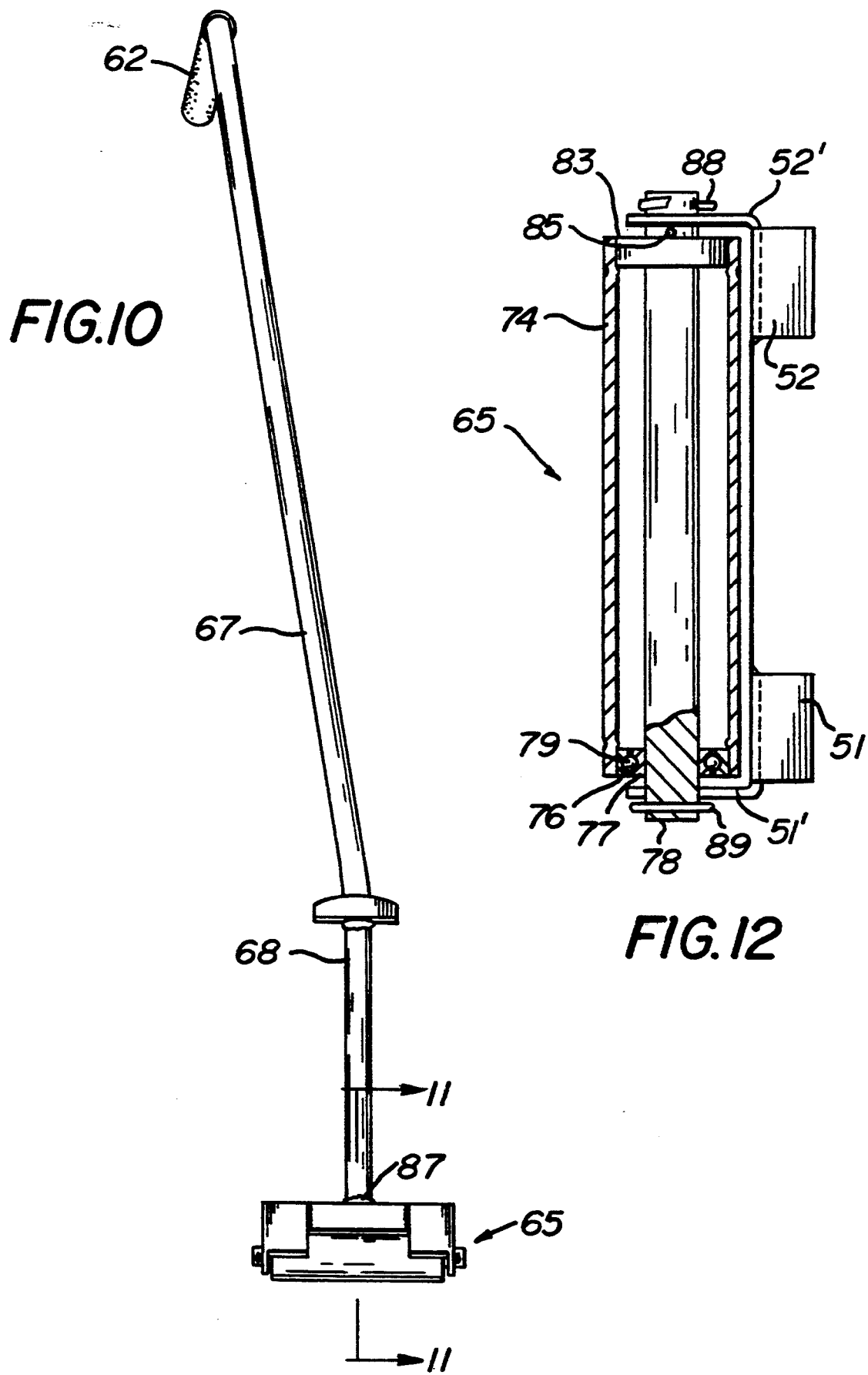

CRATE MOVING DEVICE

BACKGROUND OF THE INVENTION

Packaged food products such as dairy products, fruit juices, eggs, bread, etc. are commonly transported and stored in specialized crates. The crates have orifices in their sides to allow the crates to be grasped by users and weight bearing flanges on the crate bottoms to allow the crates to be stacked. An example of such a crate is a milk crate. The crates are very useful because they provide protection to the packages and are designed to be stacked to conserve space when storing or shipping the packaged food products.

Empty crates used to transport and store packaged food products are not heavy. However, even a single crate when full of packaged food products can be quite heavy. For example, a milk crate containing sixteen quarts of milk can weigh about thirty pounds. Since crates are usually stacked when stored and transported, it follows that a stack of five milk crates could weigh about 150 pounds. It is also common to stack crates in moving trucks, storage warehouses, coolers, etc. which have floors with surfaces made of non-skid materials such as diamond plate steel, roughly finished concrete, wooden pallets, etc. People who must ship and store packaged food products, therefore, are faced with the problem of moving heavy stacks of crates over rough floor surfaces. The most common way to move these stacks is by using a long metal tool with a hook at a lower end which is inserted into a hand orifice on the crate at the bottom of a stack. The upper end of the metal tool has a spade type grip which is held by the stack mover. The tool is used to drag the crate stack across the floor to move the stack. Thus, due to the weight of the stacked crates full of food products and the rough floor surfaces, moving stacked crates is hard work. Therefore, a need exists for a device which would reduce the amount of effort required for a person to move a stack of packaged food crates over a rough surface such as diamond plate steel, wooden pallets or rough concrete.

Thus, the object of this invention is to provide a device which will allow a person to easily move a stack of crates containing packaged food products over surfaces such as diamond plate steel, wooden pallets, or rough concrete.

SUMMARY OF THE INVENTION

To achieve the foregoing objects and in accordance with the purposes of the present invention as embodied and broadly described herein, one characterization of the present invention comprises a device for moving stackable crates, said crates having hand grip orifices and weight bearing flanges, comprising a lever means, a handle means attached to said lever means, a hook attached to said lever means, a stop attached to said lever means and a roller means attached to said lever means.

In another characterization of the present invention, a device comprises a lever means, a handle means attached to the lever means, a hook attached to the lever means, a stop attached to the lever means and a roller means attached to the lever means. Said lever means comprised of a rod having an upper portion, a lower portion attached to said upper portion and an attachment member attached to said lower portion. Said handle means is comprised of a bar having a straight portion and a curved portion, said straight portion attached to said upper portion of said lever means, said curved portion attached to said straight portion of said bar; said handle means further comprised of a polymeric sheath attached to said straight portion of said bar. Said hook attached to said upper portion of said lever means and said hook attached to said lower portion of said lever means. Said stop comprised of an "L" shaded member attached to said attachment member of said lever means. Said roller means comprising a plurality of cylinders, a plurality of cylinder rings, said cylinder rings having grooved interior surfaces and said rings attached to said cylinders; a plurality of axle rings, said rings having grooved exterior surfaces and said axle rings positioned adjacent said cylinder ring; a stationary axle, said axle attached to said axle rings, said axle attached to said attachment member of said lever means; and a plurality of ball bearings disposed between said grooves of said cylinder rings and said axle rings.

In another characterization of the present invention, a device comprises a lever means, a handle means attached to the lever means, a hook attached to the lever means, a stop attached to the lever means and a roller means attached to the lever means. Said lever means comprised of a rod having an upper portion, a lower portion attached to said upper portion and an attachment member attached to said lower portion. Said handle means is comprised of a bar having a straight portion and a curved portion, said straight portion attached to said upper portion of said lever means, said curved port,on attached to said straight portion of said bar; said handle means further comprised of a polymeric sheath attached to said straight portion of said bar. Said hook attached to said upper portion of said lever means and said hook attached to said lower portion of said lever means. Said Stop comprised of a plurality of approximately "L" shaded members, each said member having a flange, said members attached to said attachment member of said lever means. Said roller means comprising a cylinder, a plurality of cylinder rings, said cylinder rings having grooved interior surfaces and said rings attached to said cylinder; a plurality of axle rings, said axle rings having grooved exterior surfaces and said axle rings positioned adjacent said cylinder rings; a stationary axle, said axle attached to said axle rings, said axle attached to flanges of said stop; and a plurality of ball bearings, said ball bearings disposed between said grooves of said cylinder rings and said axle rings.

In the preferred characterizations of the invention, the roller means of the invention is attached approximately perpendicularly to the lower portion of the lever means such that the upper portion of the lever means is oblique to the roller means and the handle means is offset from the roller means to facilitate use of the invention by a right handed or left handed person.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIG. 1 is a perspective view illustrating an embodiment of the crate moving device of the present invention having a plurality of rollers and a single "L" shaded stop;

FIG. 2 is a side view illustrating a crate moving device lifting a crate at the bottom of a crate stack:

FIG. 3 is a partially cut-away side view illustrating a crate moving device immediately prior to lifting a crate at the bottom of a crate stack;

FIG. 4 is a frontal view illustrating the non-linear construction of a crate moving device lever means;

FIG. 5 is a partially cut-away sectional view taken along lines 5—5 of FIG. 4 illustrating the roller means of the crate moving device illustrated in FIG. 4;

FIG. 6 is a partially cut-away sectional view taken along lines 6—6 in FIG. 5 illustrating the roller means of the crate moving device illustrated in FIG. 5;

FIG. 7 is a perspective view illustrating an embodiment of the crate moving device of the present invention having a single roller and a plurality of "L" shaped stops;

FIG. 8 is a side view illustrating a crate moving device lifting a crate at the bottom of crate stack;

FIG. 9 is a partially cut-away side view illustrating a crate moving device immediately prior to lifting a crate at the bottom of a crate stack;

FIG. 10 is a frontal view illustrating the non-linear construction of a crate moving device lever means;

FIG. 11 is a partially cut-away sectional view taken along lines 11—11 of FIG. 10 illustrating the roller means of the crate moving device illustrated in FIG. 10; and FIG. 12 is a partially cut-away sectional view taken along lines 12—12 in FIG. 11 illustrating the roller means of the crate moving device illustrated in FIG. 11.

DETAILED DESCRIPTION OF THE PREFERRED EMBODIMENT

Referring to FIG. 1, one embodiment of this invention is shown generally as device 10. Device 10 is comprised of lever means 11 and handle means 12, hook 13, stop 14, and roller means 15 all attached to lever means 11. Lever means 11 is a rod having an upper portion 17 and a lower portion 18 attached to upper portion 17 and an attachment member 9 attached to lower portion 18 as shown in FIGS. 2 and 5. Handle means 12 is comprised of a bar having straight portion 21 surrounded by polymeric sheath 22 and having curved portion 23 as shown in FIG. 2. Polymeric sheath 22 is a sheath made of materials such as rubber or plastic to allow the user of device 10 to obtain a firm grip on handle means 12. Hook 13 is a rigid member connected to lever means 11 at the juncture of upper portion 17 and lower portion 18 as shown in FIG. 1. Roller means 15 is comprised of a plurality of cylinders, a plurality of cylinder rings having interior grooved surfaces, a plurality of axle rings having exterior grooved surfaces, a plurality of ball bearings, and a stationary axle. The cylinder, ring, ball bearing, ring, axle arrangements are illustrated in FIGS. 5 and 6. Cylinder 25 is attached to interior grooved cylinder ring 26. Ring 26 is adjacent exterior grooved axle ring 27. Ring 27 is attached to axle 28. A plurality of ball bearings 29 are disposed in the groove between adjacent rings 26 and 27 as shown in FIGS. 5 and 6. Though not shown in detail in the Figures, similar cylinder, interior grooved cylinder ring, ball bearing, exterior grooved axle ring and axle arrangements are located at 33, 34, and 35 in FIG. 6 to permit cylinders 24 and 25 to rotate about axle 28. Cylinders 24 and 25 are held in position on axle 28 by cotter pins 38 and 39 and studs 30 and 31 as shown in FIG. 6. Stationary axle 28 is attached to the lower portion 18 of lever means 11 by attachment member 9 as shown in FIG. 5. Attachment member 9 is a rigid "L" shaped member which facilitates attachment of roller means 15 and stop 14 to lever means 11. Stop 14 is a rigid "L" shaped member attached to attachment member 9 of lever 11 as shown in FIG. 5.

Device 10 is used, as shown in FIG. 2 and 3, by first inserting hook 13 into a handle orifice of a crate such as handle orifice 41 of crate 40 shown in FIG. 3, to detachably engage the top edge 42 of orifice 41. Roller means 15 is then slid toward crate 40 while applying downward pressure on handle means 12 until stop 14 engages crate side 46 as shown in FIG. 2. Downward pressure exerted on handle means 12 causes the bottom edge 44 of side 46 to be lifted off the floor surface 200 by hook 13 while the bottom edge 45 of side 47 remains in contact with floor surface 200 as shown in FIG. 2. Crate stack 48 is then tilted away from device 10 and is grasped by the user of device 10 at the top most crate to keep the crate stack from toppling (not shown in the figures). The crate stack is then moved by using device 10 to simultaneously roll and drag the crate stack over floor surface 200. Thus, a stack of crates can easily be moved over rough floor surfaces because the surface area of the bottom most crate dragged across the floor is reduced to a single edge and a portion of the crate stack's weight is supported by the roller means of the crate moving device. Device 10 is constructed such that roller means 15 is attached approximately perpendicularly to lower portion 18 of lever means 11 at juncture 37 as shown in FIGS. 1 and 4. Lever means 11 is constructed such that the upper portion 17 of lever means 11 is oblique to roller means 15 and handle means 12 is offset and non-alignable with juncture 37 of roller means 15 and lever 11 as shown in FIGS. 1 and 4. The oblique construction of device 10 allows the user of device 10 to use a right hand to grasp handle means 12 to maneuver device 10 and a left hand to grasp the top of a crate stack during crate stack moving (not shown in the Figures). A right-hand device is shown in the drawings for descriptive purposes; however, it is within the scope of the invention for a device having a lever means with an obliquely positioned handle means to allow the user of a device to use a left hand to grasp a handle means to maneuver a device and a right hand to grasp the top of a crate stack during crate stack moving, thus, the device being a left-hand device.

Referring to FIG. 7, another embodiment of this invention, is shown generally as device 60. Device 60 is comprised of lever means 61 and handle means 62, hook 63, stop 64 and roller means 65, all attached to lever means 61. Lever means 61 is a rod having an upper portion 67 a lower portion 68 attached to upper portion 67 and an attachment member 59 attached to lower portion 68 as shown in FIG. 11. Handle means 62 is comprised of a bar having straight portion 71 surrounded by polymeric sheath 72 and having curved portion 73 as shown in FIG. 8. Hook 63 is a rigid member connected to lever means 61 at the juncture of upper portion 67 and lower portion 68 as shown in FIG. 8. Stop 64 is comprised of two approximately "L" shaped members 51 and 52 having flanges 51' and 52', respectively. "L" shaped members 51 and 52 are attached to lever means 61 by attachment member 59 as shown in FIGS. 7 and 11. Roller means 65 is comprised of a cylinder, a plurality of interior grooved cylinder rings, a plurality of exterior grooved axle rings, a plurality of ball bearings and an axle. The cylinder, interior grooved cylinder ring, ball bearing, exterior grooved axle ring and axle arrangements are illustrated in FIG. 12 by cylinder 74 attached to interior grooved cylinder ring 76. Ring 76 is adjacent exterior grooved axle ring 77 which is attached to axle 78. A plurality of ball bearings 79 are disposed in the grooves between adjacent rings 76 and 77 as shown in FIGS. 11 and 12. A similar ring and ball bearing arrangement is located at 83 in FIG. 12, but is not illustrated in detail. The cylinder, interior grooved cylinder ring, ball bearing, exterior grooved axle ring, and axle arrangement allows cylinder 74 and ring 76 to rotate around ring 77 and stationary axle 78. Axle 78 is attached to flanges 51' and 52' of "L" shaped members 51 and 52, such that axle 78 is stationary and does not rotate as shown in FIG. 7. Axle 78 and cylinder 74 are held in position on flanges 71' and 72' by cotter pins 88 and 89 and studs 85 as shown in FIG. 12. Device 60 is used, as shown in FIGS. 8 and 9, by first inserting hook 63 into a handle orifice of a crate such as handle orifice 91 of crate 90, as shown in FIG. 9, to detachably engage the top edge 92 of orifice 91. Roller means 65 is then slid toward crate 90 while applying downward pressure on handle means 62 until stop 64 engages crate side 96 as shown in FIG. 8. Downward pressure exerted on handle means 62 causes crate 90 to be lifted by hook 63. The bottom edge 94 of crate side 96 is lifted off the floor surface 100 by hook 63 while the bottom edge 95 of crate side 97 remains in contact with floor surface 100 as shown in FIG. 8. Crate stack 98 is then tilted away from device 60 and is grasped by the user of device 60 at the top most crate to keep the crate stack from toppling (not shown in the figures). The crate stack is then moved by using device 60 to simultaneously roll and drag the crate stack over floor surface 100. Thus, a stack of crates can easily be moved over rough floor surfaces because the surface area of the bottom most crate dragged across the floor is reduced to a single edge and a portion of the crate stack's weight is supported by the roller means of the crate moving device. Device 67 is constructed such that roller means 65 is attached approximately perpendicularly to lower portion 68 of lever means 61 at juncture 87 as shown in FIGS. 7 and 10. Lever means 61 is constructed such that upper portion 67 of lever means 61 is oblique to roller means 65 and handle means 62 is offset and non-alignable with juncture 87 of roller means 65 and lower portion 67 of lever means 61 as shown in FIGS. 7 and 10. The oblique construction of device 60 allows the user of device 60 to use a right hand to grasp handle means 62 to maneuver device 60 and a left hand to grasp the top of crate stack 80 during crate stack moving. A right-hand device is shown in the drawings for descriptive purposes; however, it is within the scope of the invention for a device having a lever means with an obliquely positioned handle means to allow the user of a device to use a left hand to grasp a handle means to maneuver a device and a right hand to grasp the topmost crate in the crate stack during crate stack moving, thus, the device being a left-hand device.

The purpose of the curved handle portions illustrated as curved portion 23 in FIG. 2 and curved portion 73 in FIG. 8 are to enable the device user to hang the device on walls or in the trailer portion of moving trucks when the device is not in use.

The advantages associated with a single cylinder roller means versus a multi-cylinder roller means are determined by the use of the device. Multi-cylinder roller means are utilized when moving crates over smooth, flat surfaces such as linoleum, or concrete. Single roller devices are utilized when moving crates over rough floor surfaces such as diamond plate steel or on surfaces where a narrow roller means is required to fit into confined spaces.

The device allows stacks of packaged food crates such as milk crates, egg crates, bread crates, etc. to be moved across rough floor surfaces with less effort on the part of the device user than is needed when using conventional metal hooks and reduces abrasion, due to dragging across rough floor surfaces, on the bottom most crate.

While the preferred embodiments have been fully described and depicted for the purpose of explaining the principles of the present invention, it will be appreciated by those skilled in the art that modifications, substantiations, and changes may be made thereto without departing from the scope of the invention set forth in the appended claims.

I claim:

1. A device for dragging a plurality of stackable crates having front and rearward bottom edges as well as a hand grip orifice, comprising:
    a.) a lever means having upper and lower portions, and said lower portion being oblique with respect to said upper portion;
    b.) a handle means attached to said upper portion of said lever means for enabling said oblique lower portion to move to a vertical position;
    c.) a hook attached to said lever means where said upper and lower portions are joined, and for attaching to an orifice of a bottommost crate of said stackable crates when said lower portion is vertical;
    d.) means attached to an end of said lower portion of said lever means for positioning under and maintaining the front edge of said bottommost crate off of the ground upon moving the lower portion of the lever means to a vertical position;
    e.) roller means located behind said attached means connected approximately perpendicular to said lower portion of said lever means for moving said crates,
    f.) whereby the moving of said lower portion to said vertical position and the lifting of said front edge of said bottommost crate off the ground onto its rearward edge allows facile dragging of said stackable crates to a different location.

2. The device of claim 1 wherein said attached means is comprised of an "L" shaped member.

3. The device of claim 1 wherein said roller means comprises:
    a.) a plurality of cylinders,
    b.) a plurality of cylinder rings, said cylinder rings having grooved interior surfaces and said rings attached to said cylinders,
    c.) a plurality of axle rings, said rings having grooved exterior surfaces and said axle rings positioned adjacent said cylinder rings,
    d.) a stationary axle, said axle attached to said axle rings, said axle attached to an attachment member, and
    e.) a plurality of ball bearings disposed between said grooves of said cylinder rings and said axle rings.

4. The device of claim 1 wherein said attached means is comprised of a plurality of approximately "L" shaped members.

5. The device of claim 1 wherein said roller means is attached approximately perpendicularly to said lower portion of said lever means such that said upper portion of said lever means is oblique to said roller means, and said handle means is offset from said roller means.

6. The device of claim 2 wherein said L-shaped member has a lower portion and an upper portion, said lower portion of said L-shaped member being generally horizontal when said lower portion of said lever is vertical.

7. The device of claim 6 wherein said lower portion of said L-shaped member is a flange extending across said roller means along the longitudinal axis of said roller means.

* * * * *